Patented July 18, 1950

2,515,206

UNITED STATES PATENT OFFICE 2,515,206

SPINNING PROCESS AND COMPOSITIONS

Theron G. Finzel, Westlake, and Gaetano F. D'Alelio, Shaker Heights, Ohio, assignors to Industrial Rayon Corporation, Cleveland, Ohio, a corporation of Delaware No Drawing. Application January 23, 1947, Serial No. 723,900

27 Claims. (Cl. 18—54)

This invention relates to copolymers of acrylonitrile. More particularly, it is concerned with tripolymers containing in the polymer molecule acrylonitrile, vinylidene chloride and vinyl chloride, and with compositions of these copolymers adapted to the preparation of formed structures. This invention also deals with processes for the conversion of these copolymers to shaped articles and to molecularly oriented fibers, threads, bristles, mono-filaments, etc., hereinafter referred to as "fibers," and other shaped articles, such as films and the like.

It has been proposed that acrylonitrile may be copolymerized with vinyl chloride and with vinylidene chloride for use in the preparation of molecularly oriented shaped articles. Such copolymers have had various disadvantages. For example, some of these copolymers are not suitable for permanently retaining sufficient molecular orientation to make fibers, yarns and fabrics of desired tensile strength. Others may have good molecular orientation properties but the high bonding strengths of the constituent groups may result in solubility characteristics which prohibit the use of practicable and economical solvents in the preparation of shaped articles from compositions of these copolymers.

It appears that the lateral disorder generally required in the molecular structures of these copolymers to impart desirable solubility characteristics often results in deleterious effects on the molecular orientation properties, heat stability, relaxation resistance, heat resistance, etc.

It has now been found that tripolymers may be made containing in the polymer molecule about 78–82 percent acrylonitrile, about 3–7 percent vinylidene chloride and about 15 percent vinyl chloride, which tripolymers have particularly advantageous molecular orientation and solubility properties as well as good heat stability, relaxation resistance and heat resistance. It has also been found that such copolymers may be converted to shaped articles and molecularly oriented structures by the process of forming solutions of these tripolymers in a nitroalkane of no more than two carbon atoms, coagulating the copolymers into shaped articles in a bath comprising an aromatic hydrocarbon liquid, and thereafter subjecting the article to such further treatment, e. g. cold drawing, heat treatment, etc., as may be necessary to give the article the desired properties.

This invention will be more fully described by the following examples, although it is understood that the invention is not intended to be limited thereto by the examples. These examples illustrate the preparation of acrylonitrile-vinylidene chloride-vinyl chloride tripolymers in preparing shaped articles and molecularly oriented structures. Throughout this application "parts" and "percent" of materials is intended to mean parts and percent by weight.

EXAMPLE I

Copolymer compositions in parts by weight

| Acrylonitrile | Vinylidene Chloride | Vinyl Chloride | Nitromethane Solubility |
|---|---|---|---|
| 85 |  | 15 | Difficultly soluble. |
| 80 | 10 | 10 | Do.[1] |
| 82 | 3 | 15 | Soluble. |
| 80 | 5 | 15 | Do. |
| 78 | 7 | 15 | Do. |
| 85 | 15 |  | Insoluble. |

[1] More difficultly soluble than the first copolymer.

Six copolymers having the compositions indicated in the above table and having molecular weights of at least about 10,000, were prepared in yields of 97–100% by copolymerizing the corresponding mixtures of monomers under the following conditions. The mixed monomers were added to 750–1000 parts of distilled water at about 25° C. containing dissolved therein two parts of "Alkanol B" (an alkyl naphthalene sodium sulfonate emulsifying agent produced by duPont), 0.3 to 0.5 part of ammonium persulfate and 0.45 to 0.75 part of sodium bisulfite in glass pressure flasks, the equipment sealed and the temperature raised to 50–55° C. and controlled thermostatically. The mixture was heated and agitated for 1–1.5 hours, then cooled to room temperature and the dispersion precipitated by the addition of a saturated sodium sulfate or aluminum sulfate aqueous solution with agitation. The precipitated copolymer was filtered and then washed with distilled water until free of the dispersing agent and sulfate ion. The product was dried at 50–60° C. and ground to pass a 200-mesh screen. The resulting copolymers were insoluble in acetone, dioxane, ethyl acetate, butyl acetate, methyl alcohol, cyclohexanone, benzene, toluene, xylene, etc., and the solubilities in nitromethane were as indicated in the table above.

EXAMPLE II

A tripolymer having in the polymer molecule 80% acrylonitrile, 5% vinylidene chloride, and 15% vinyl chloride was prepared according to the directions of Example I. The resulting copolymer was dissolved in nitromethane to form a 16% solution which was exceptionally fluid at 50–80° C. This solution was spun at 50–80° C. at a jet velocity of 438 inches per minute through a spinnerette having 40 orifices, each of which orifices was 0.003 inches in diameter, into a bath comprising high-flash aromatic naphtha at a temperature of about 55–75° C. (This naphtha was a coal tar high-flash naphtha, substantially all aromatic, having a boiling range about 150–185° C.) The coagulated fiber was withdrawn from the bath by means of an intermediate revolving cylinder which had a peripheral speed of 223 inches per minute. This product was thereafter immersed in a white mineral oil (having a specific gravity of 0.845–0.855 and Saybolt viscosity of 80–90 at 100° F.) at 140–160° C. and then given a 980% stretch between the intermediate cylinder and the wind-up spool. This wind-up spool had a peripheral speed of 2400 inches per minute and gave a stretch ratio of 10.8. The stretched fiber was collected on spools, washed with xylene to remove mineral oil and then dried at 50–70° C.

After being given a twist of about 3 to 6 turns per inch the product was then heat treated in an oven at 150° C. for about 15–60 minutes. In some cases the fiber or yarn was heat treated while wound on a spool and in other cases while in skein form. Prior to heat treatment the fiber showed a tenacity of 4.8–5.0 grams per denier with 7.2–7.3% elongation. Heat treatment of the fiber wound on a spool resulted in a product having a tenacity of 5.4–5.8 grams per denier with 10.5–10.9% elongation. Heat treatment of the yarn in skein form gave a product showing a tenacity of 4.8–5.4 grams per denier and 16–17.5% elongation.

The heat treated fibers were exceptionally heat resistant, showing about 0 to 3% shrinkage at 100° C. They did not show any melting point up to 300° C. These fibres were pure white, needing no bleaching and could be readily dyed. They were soft supple and pleasant to touch.

EXAMPLE III

The tripolymer solution of Example II was spun as in Example II but was collected without stretching. The fiber was dried on the collecting spool at 35°–50° C. and then drawn over a hot roller at 170–180° C. during which operation the fiber was stretched 970%. The stretched fiber was heat treated at the same temperature and in the same manner as in Example II. The product was twisted 3–6 turns per inch, twist-set in a high frequency electrical field and then treated with a textile finish consisting of a 0.5% aqueous solution of Nopco 1921 D, produced by The National Oil Products Company. Nopco 1921 D has the following composition: White oil, 65%; glycerine, 2%; olive oil, 4%; sulfonated isobutyl oleate, 25%; and water, 4%.

The fiber which was heat treated on a spool showed 5 grams per denier tenacity with 9.4% elongation while the sample heat treated in skein form showed a tenacity of 4.4 grams per denier with 16.5% elongation. These fibers could be knitted without difficulty.

EXAMPLE IV

The tripolymer solution of Example II was spun and the resultant fiber collected and stretched as in Example II. After washing with xylene the fiber was air dried. Then the untwisted fiber was cut into lengths of about 3–4 inches and put into an oven at about 130° C. for about 15 minutes. The resultant product had good tensile strength, was soft to the touch, and possessed a deep wool-like crimp.

The copolymers of this invention may be prepared by any suitable method, for example, by mass polymerization, emulsion polymerization, etc. It may be advantageous to add various ingredients to the polymerizable mass such as catalysts, emulsifying agents, solvents, etc. Various materials may be also incorporated in the copolymers. For example, plasticizers, lubricants, pigments, etc. may be added either to the polymerizable mass or the copolymers to give delustering or other special properties to the resultant product.

For use in the preparation of shaped articles, the copolymers of this invention have molecular weights preferably of at least about 10,000. However, copolymers of molecular weights less than 10,000 may be used for other purposes, such as impregnants, solvent resistant coatings, etc. The molecular weight of the copolymers is dependent on the concentrations of monomers, the amount and type of catalyst, the temperature of reaction, etc.

As is quite generally known in the field of high polymers, molecular orientation is usually indicated and identified by birefringence of polarized light, as under Nichol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation. Amorphous or non-crystalline materials given X-ray diagrams having very few high lights or bright areas or spots whereas crystalline and oriented materials give definite X-ray diffraction patterns. In these patterns there are definite relationships of the bright areas or spots with regard to position and spacing which are generally characteristic of the composition of the material being X-rayed. In fibers or films the orientation usually follows the direction of drawing or stretching so that the orientation is parallel to the fiber axis or a major surface.

In the practice of this invention the solvents may be defined as nitroalkanes having not more than two carbon atoms, namely, nitromethane and nitroethane. In some cases, it may be more advantageous to use nitromethane since it sometimes has better solubility characteristics for these tripolymers.

The precipitants suitable for use in this invention must be non-solvents for the tripolymer while the tripolymer is dissolved in the nitroalkane, and must also be a solvent for or miscible with the nitroalkane. Aromatic hydrocarbon liquids have been found to be especially useful as such a precipitant. The term "aromatic hydrocarbon liquid" is intended to include aromatic hydrocarbons (containing only hydrogen and carbon) and mixtures of such compounds which are liquid at some temperatures between 20 and about 100° C. Examples of suitable precipitants are toluene, xylene, benzene, aromatic napthas, etc. Aromatic naphthas should advantageously contain more than about 50% aromatic hydrocarbons and exhibit solubilities toward the acrylonitrile copolymers and their solvents similar to those shown by xylene, toluene, etc.

"Cold drawing" may be defined as the stretching of a polymeric material at a temperature below the melting point of the material to give a molecularly oriented structure. The term "heat treated," as used herein, refers to the application of heat to an object usually at a controlled temperature and usually through the medium surrounding the object. Usually the fibers of this invention are heat treated at substantially constant length but it may sometimes be advantageous to heat treat at substantially constant tension. In some cases, as in Example IV, staple or short-length fibers may be heat treated under substantially no tension to produce wool-like, crimped fibers.

Various modifications in the cold drawing step may be used. For example, the fiber may be stretched over a heated pin, a heated roller or through a hot tube. Prior to or simultaneously with the cold drawing operation the fiber may be treated with a liquid inert toward the fiber, to serve either as a lubricant, or a heat transfer medium, or both. This liquid may be applied separately or may be added to the coagulating bath. For example, mineral oil may be added to a xylene bath, so that upon evaporation of the xylene coagulating medium the mineral oil remains on the fiber to serve as a lubricant. In some cases the fiber may be passed through a heated oil bath or other liquid bath inert toward the fiber to raise the temperature of the fiber to a degree suitable for cold drawing.

The tripolymers of this invention are particularly adaptable to the formation of fine denier yarn. The high degree of stretch to which these fibers may be subjected permits the preparation of fine yarn producing soft fabric with good hand, and good drape which are unusual in a synthetic fiber. Moreover, fibers prepared by the methods disclosed herein are especially advantageous because of their tensile strength and good resistance to heat and shrinkage. These properties make the fibers desirable for use in the manufacture of hosiery and for such all purpose fabrics as are used for blouses, shirts, suits, etc.

We claim:

1. A tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

2. A tripolymer having a molecular weight of at least about 10,000 and containing in the polymer molecule about 80 percent acrylonitrile, about 5 percent vinylidene chloride and about 15 percent vinyl chloride, the sum of the copolymerized compounds equaling 100 percent.

3. A composition comprising a nitroalkane of no more than two carbon atoms and a tripolymer, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

4. A composition comprising nitromethane and a tripolymer, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

5. A composition comprising a nitroalkane of no more than two carbon atoms and a tripolymer, said tripolymer having a molecular weight of at least about 10,000 and containing in the polymer molecule about 80 percent acrylonitrile, about 5 percent vinylidene chloride and about 15 percent vinyl chloride.

6. A composition comprising nitromethane and a tripolymer, said tripolymer having a molecular weight of at least about 10,000 and containing in the polymer molecule about 80 percent acrylonitrile, about 5 percent vinylidene chloride and about 15 percent vinyl chloride.

7. A process for producing a shaped article, which process comprises forming a solution of an acrylonitrile tripolymer in a nitroalkane of no more than two carbon atoms, and extruding said tripolymer into a shaped article in a bath comprising an aromatic hydrocarbon liquid, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

8. A process for producing a shaped article, which process comprises forming a solution of an acrylonitrile tripolymer in a nitroalkane of no more than two carbon atoms and extruding said tripolymer into a shaped article in a bath comprising xylene, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

9. A process for producing a cold drawn shaped article having molecular orientation, which process comprises forming a solution of an acrylonitrile tripolymer in a nitroalkane of no more than two carbon atoms, extruding said tripolymer into a shaped article in a bath comprising an aromatic hydrocarbon liquid, and cold drawing the resulting product, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

10. A process for producing a cold drawn shaped article having molecular orientation, which process comprises forming a solution of an acrylonitrile tripolymer in a nitroalkane of no more than two carbon atoms, extruding said tripolymer into a shaped article in a bath comprising an aromatic hydrocarbon liquid, cold drawing the resulting product, and heat treating the shaped article at substantially constant length, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

11. A process for producing a fiber, which process comprises forming a solution of an acrylonitrile tripolymer in a nitroalkane of no more than two carbon atoms, and extruding said tripolymer into a fiber in a bath comprising an aromatic hydrocarbon liquid, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

12. A process for producing a fiber, which process comprises forming in nitromethane a solution of an acrylonitrile tripolymer and extruding said tripolymer into a fiber in a bath comprising an aromatic hydrocarbon liquid, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

13. A process for producing a fiber, which process comprises forming in nitromethane a solution of an acrylonitrile tripolymer and extruding said tripolymer into a fiber in a bath comprising xylene, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

14. A process for producing a fiber, which process comprises forming in nitromethane a solution of an acrylonitrile tripolymer and extruding said tripolymer into a fiber in a bath comprising an aromatic hydrocarbon liquid, said tripolymer having a molecular weight of at least about 10,000 and containing in the polymer molecule about 80 percent acrylonitrile, about 5 percent vinylidene chloride and about 15 percent vinyl chloride, the sum of the copolymerized compounds equaling 100 percent.

15. A process for producing a cold drawn fiber having molecular orientation, which process comprises forming in a nitroalkane of no more than two carbon atoms a solution of an acrylonitrile tripolymer, extruding said tripolymer into a fiber in a bath comprising an aromatic hydrocarbon liquid and cold drawing the resulting product, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

16. A process for producing a cold drawn fiber having molecular orientation, which process comprises forming in a nitroalkane of no more than two carbon atoms a solution of an acrylonitrile tripolymer, extruding said tripolymer into a fiber in a bath comprising an aromatic hydrocarbon liquid, cold drawing the resulting product, and heat treating the cold drawn fiber at substantially constant length, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

17. A process for producing a cold drawn fiber having molecular orientation, which process comprises forming in a nitroalkane of no more than two carbon atoms a solution of an acrylonitrile tripolymer, extruding said tripolymer into a fiber in a bath comprising xylene, cold drawing the resulting product, and heat treating the cold drawn fiber at substantially constant length, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

18. A process for producing a cold drawn fiber having molecular orientation, which process comprises forming in nitromethane a solution of an acrylonitrile tripolymer, extruding said tripolymer into a fiber in a bath comprising an aromatic hydrocarbon liquid, and cold drawing the resulting product, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

19. A process for producing a cold drawn fiber having molecular orientation, which process comprises forming in nitromethane a solution of an acrylonitrile tripolymer, extruding said tripolymer into a fiber in a bath comprising xylene, cold drawing the resulting product, and heat treating the cold drawn fiber at substantially constant length, said tripolymer having a molecular weight of at least about 10,000 and containing in the polymer molecule about 80 percent acrylonitrile, about 5 percent vinylidene chloride and about 15 percent vinyl chloride, the sum of the copolymerized compounds equaling 100 percent.

20. A process for producing a crimped fiber, which process comprises forming in a nitroalkane of no more than two carbon atoms a solution of an acrylonitrile tripolymer, extruding said tripolymer into a fiber in a bath comprising an aromatic hydrocarbon liquid, cold drawing the resulting product, cutting the product into stable fiber, and heat treating the stable fiber at substantially zero tension, said tripolymer having a molecular weight of at least about 10,000 and containing in the polymer molecule about 78–82 percent acrylonitrile, about 3–7 percent vinylidene chloride and about 15 percent vinyl chloride, the sum of the copolymerized compounds equaling 100 percent.

21. A process for producing a wool-like fiber, which process comprises forming in nitromethane a solution of an acrylonitrile tripolymer, extruding said tripolymer into a fiber in a bath comprising an aromatic hydrocarbon liquid, cold drawing the resulting product, cutting the product into stable fiber, and heat treating the stable fiber at substantially zero tension, said tripolymer having a molecular weight of at least about 10,000 and containing in the polymer molecule about 80 percent acrylonitrile, about 5 percent vinylidene chloride and about 15 percent vinyl chloride, the sum of the copolymerized compounds equaling 100 percent.

22. A shaped article comprising the tripolymer of claim 1.

23. A fiber comprising the tripolymer of claim 1.

24. A fiber comprising the tripolymer of claim 2.

25. A cold drawn fiber having molecular orientation, said fiber comprising the tripolymer of claim 1.

26. A cold drawn fiber having molecular orientation, said fiber comprising the tripolymer of claim 2.

27. A crimped fiber comprising the tripolymer of claim 1.

THERON G. FINZEL.
GAETANO F. D'ALELIO.

REFERENCES CITED

The following references are of record in the file of this patent:

UNITED STATES PATENTS

| Number | Name | Date |
| --- | --- | --- |
| 2,123,599 | Fikentscher | July 12, 1938 |
| 2,190,265 | Hubert | Feb. 13, 1940 |
| 2,233,442 | Wiley | Mar. 4, 1941 |
| 2,320,112 | Wiley | May 25, 1943 |
| 2,396,785 | Hanford | Mar. 19, 1946 |
| 2,404,781 | Arnold | July 30, 1946 |

Certificate of Correction

Patent No. 2,515,206                                              July 18, 1950

THERON G. FINZEL, ET AL.

It is hereby certified that error appears in the printed specification of the above numbered patent requiring correction as follows:

Column 1, line 11, after the word "fibers" strike out the comma; column 4, line 27, for "given" read *give*; line 68, after "treated" strike out the comma;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*